March 11, 1958 N. ALBERTI ET AL 2,826,379
AIRCRAFT WING FLAP CARRIAGE
Filed March 26, 1956 3 Sheets-Sheet 1

INVENTORS
NICHOLAS ALBERTI
JAMES B. BEACH
By
Agent

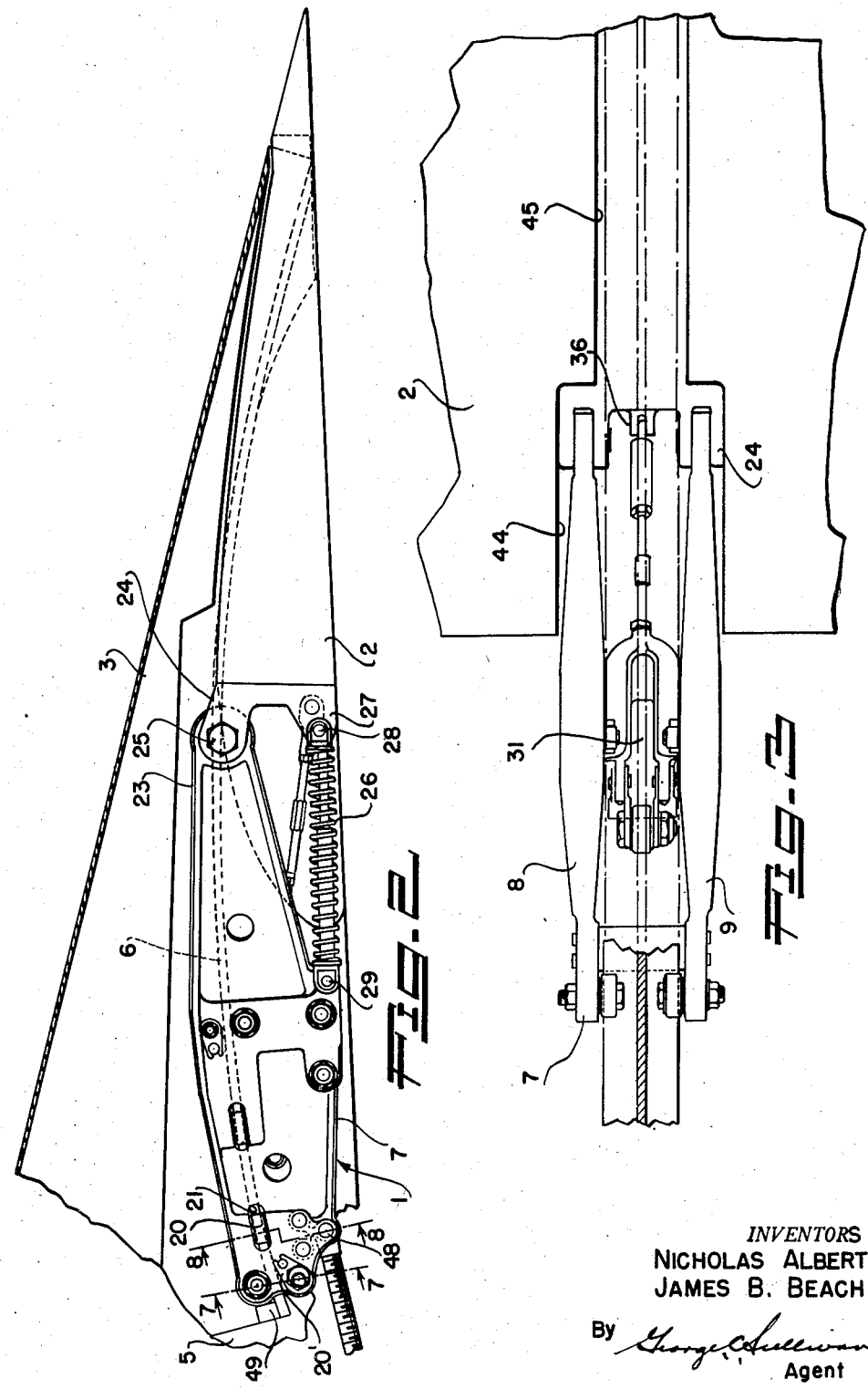

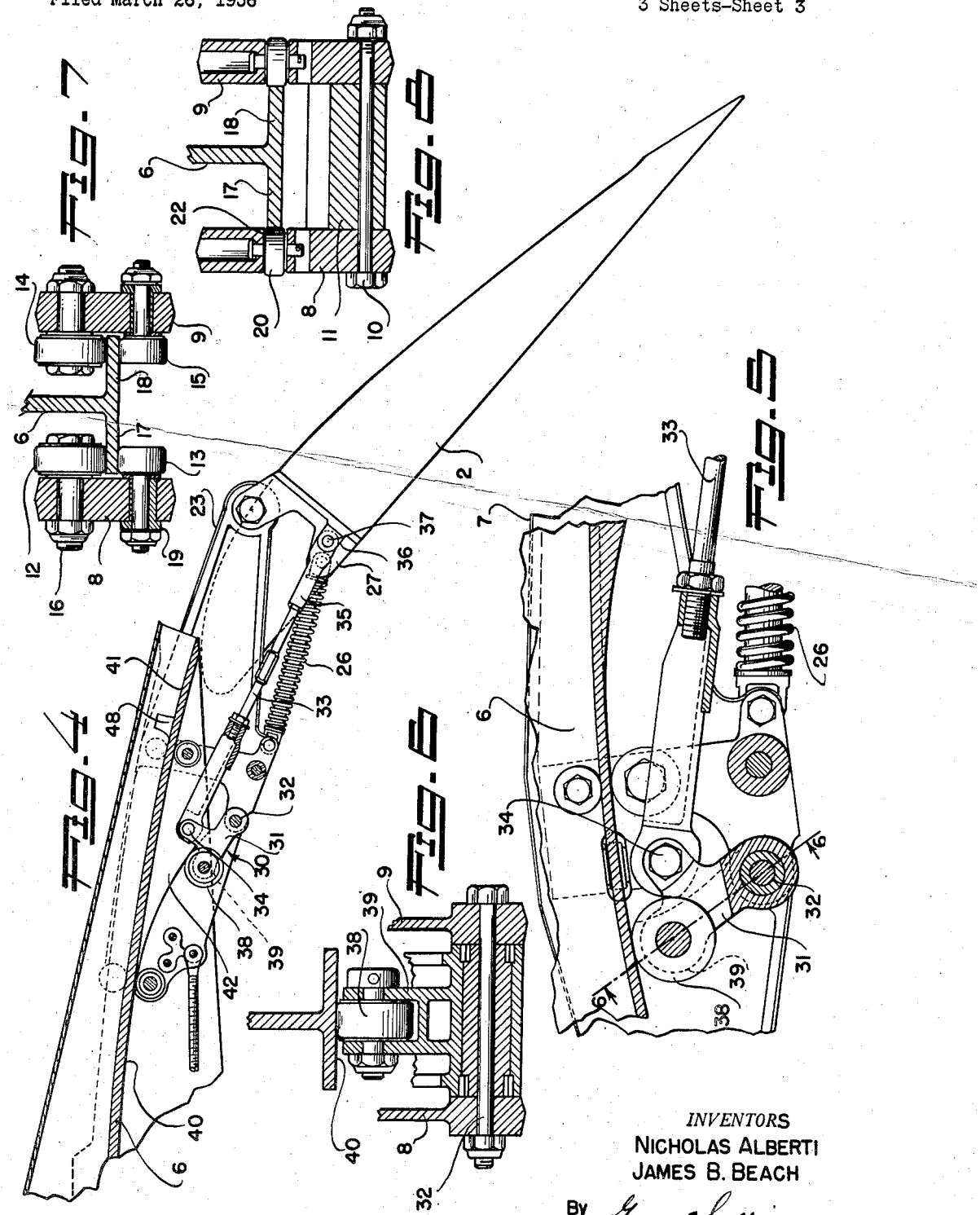

United States Patent Office 2,826,379
Patented Mar. 11, 1958

2,826,379

AIRCRAFT WING FLAP CARRIAGE

Nicholas Alberti, Sherman Oaks, and James B. Beach, Van Nuys, Calif., assignors to Lockheed Aircraft Corporation, Burbank, Calif.

Application March 26, 1956, Serial No. 573,749

6 Claims. (Cl. 244—42)

This invention relates generally to aircraft and more particularly to improvements in flap extending mechanisms for controlling the movement of wing flaps.

Extendable trailing edge flaps of the general type under consideration have been proposed and used heretofore as they are necessary to improve the take-off characteristics and reduce the landing speed of modern high performance airplanes, since without such flaps the span between landing speed and top speed is a substantially fixed limiting factor in design, some high speed aircraft having dangerously high landing speeds which limit their use to well-developed landing fields having long and smooth runways. Heretofore, such flaps have been extended from their nested position in a pocket within the wing profile by means either of arcuate or straight tracks with levers or linkages, the problem being to obtain the most desirable flap position and angle not only at the extreme extension but at intermediate points. For take-off purposes a trailing edge flap should desirably form a continuation of the upper surface of the wing with maximum effective chord length and substantially no change in the wing camber; while for landing, the flap should be capable of both full extension and considerable downward pivotal movement to increase the lift and act as a brake. It will therefore be evident that uniform arcuate or a straight line movement of the flap projecting mechanism cannot fulfill both requirements. Accordingly, it is an object of this invention to provide a flap carriage mechanism which will give maximum efficiency in flap position angle between the main airfoil and flap throughout the range of fore and aft movement of the flap.

It is another object of this invention to provide a flap carriage mechanism which will fit entirely within the contours of a thin wing and aft of the structural box thereof whereby an efficient design may be obtained. The mechanism employs a carriage which rides on a track curved to provide flap movement approximately along a path representing an extension of the wing camber line whereby a low drag, high lift effect may be obtained. The carriage swingably supports the flap while a compression spring acting between the flap and the carriage in combination with a cam and cam follower arrangement, also associated with the carriage, provides fine control over the angular position of the flap so that it may efficiently serve not only as a high lift device but also as a drag brake when landing.

Another object of this invention is to provide a flap carriage which provides ample support for the flap to minimize the effects of shock and vibration.

Another object of this invention is to provide a flap carriage for use on aircraft which will allow movement of the flap between the stowed and extended positions by the application of a relatively small actuating force. This is accomplished by a construction which will permit the exclusive use of low friction rollers in accomplishing all flap movement.

Still another object of this invention is to provide a flap carriage which is rugged in construction and capable of providing proper support for the flap under all flight conditions and over long periods of time with little or no maintenance.

Further and other objects will become apparent from a reading of the following description especially when considered in combination with the accompanying drawings wherein like numerals refer to like parts.

In the drawings:

Figure 2 is a fragmentary sectional side view showing the flap and flap carriage in the stowed position within the wing profile;

Figure 3 is a fragmentary top plan view of the flap and flap carriage with the wing and a portion of the track removed;

Figure 4 is a fragmentary sectional side view of the flap and flap carriage in the extended position relative to the wing;

Figure 5 is a sectional view showing the construction details of the cam follower mechanism;

Figure 6 is a sectional view taken on line 6—6 of Figure 5;

Figure 7 is a sectional view taken on line 7—7 of Figure 2; and

Figure 8 is a sectional view taken on line 8—8 of Figure 2.

Figure 1:
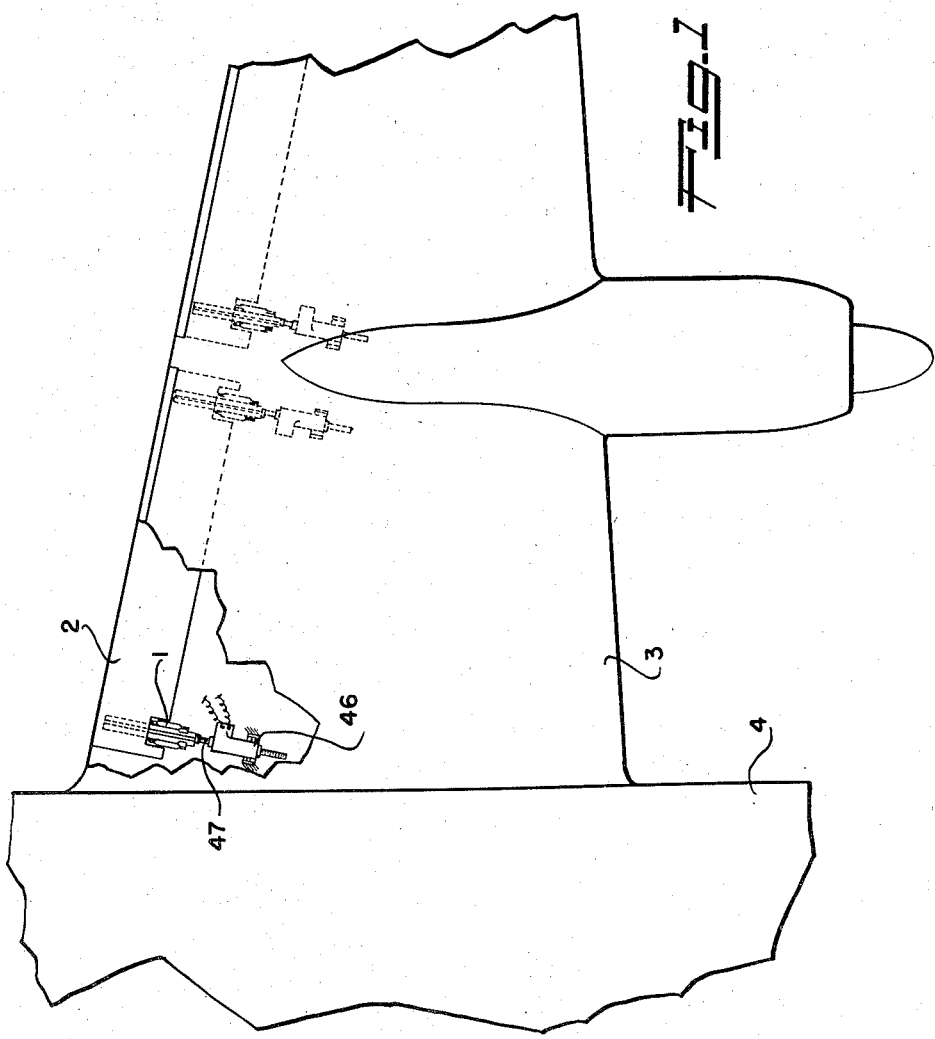
Figure 1 is a fragmentary plan view of an aircraft showing a typical installation of the wing flap carriage of this invention.

The flap carriage 1 as shown in Figures 1 and 2 supports a wing flap 2 on the under side and at the trailing edge of wing 3 forming part of an aircraft 4. In the stowed position wing flap 2 completes the contour of wing 3 with the carriage mechanism being housed within the contours of the wing and aft of the structural box 5 which transmits the wing loads into the fuselage structure.

Carriage 1 which supports wing flap 2 rides on flanges or rails 17 and 18 of track 6 forming a part of the main wing structure and suitably cantilevered from box 5. Track 6 is a T-section beam, as most clearly shown in Figures 7 and 8, and is contoured to provide, approximately, the desired flap movement from the stowed to an extended position.

Carriage 1 includes a frame 7 comprising a pair of spaced supporting side plates 8 and 9 arranged generally parallel to each other as indicated in Figures 3, 6, 7 and 8. Plates 8 and 9 are connected together and held in their proper spaced relationship by suitable means such as a plurality of bolts 10 and spaced blocks 11 as shown in Figure 8. A plurality of pairs of rollers such as rollers 12 and 13, and 14 and 15, together making up a complete set, are rotatably carried by frame 7 through suitable mounting means such as bolts 16 to engage both the upper and lower surfaces of rails 17 and 18 on track 6. As many sets of rollers as may be required to support the carriage and wing flap may be employed; however, in the normal carriage configuration two sets of the plurality of pairs of rollers 12 and 13, and 14 and 15, are adequate. To eliminate play between the carriage and track 6, one of the rollers in each pair such as roller 12 in the pair comprising rollers 12 and 13 may be supported by frame 7 through a cam-like sleeve 19, as shown in Figure 7, having an arm 20' secured thereto, as best shown in Figure 2, which may be rotated to effectively move roller 12 relative to its mating roller 13. Thus, the clearance between the rollers in each pair may be adjusted to compensate for manufacturing tolerances, for wear or the like to always maintain accurate control over the movement of the carriage and prevent the buildup of vibrations therein.

Side loads applied to the carriage are absorbed into the main wing structure by means of a plurality of rollers 20 rotatably mounted within slots 21 in plates 8 and 9 as shown in Figures 2 and 8. Rollers 20 engage the edges of flanges 17 and 18 on track 6.

The aft or trailing edge end 23 of frame 7 tapers rearwardly to engage a fitting 24 on the upper portion of wing flap 2 through a bolt 25 or other suitable pin connection which will allow swinging movement of the flap relative to the carriage about the axis of the bolt. As shown in the drawing, fitting 24, which engages frame 7, is located near the leading edge of the flap and adjacent the upper surface thereof whereby the flap may be easily stabilized against gravity and other forces which tend to rotate the flap in a clockwise direction as viewed in Figure 2. This clockwise rotation due to the force of gravity and the like is counteracted by a bungee type compression spring assembly 26 acting between fitting 27 on the wing flap, which is located near the leading edge like fitting 24 but adjacent the lower surface of the flap, and carriage 7 through pin connections 28 and 29. Since airflow around the wing normally tends to maintain the flap in a zero lift or low angle of attack position in flight, bungee spring 26 need only have sufficient strength to overcome the tendency for flap rotation in a clockwise direction due to the static unbalance resulting from the location of the flap hinge as represented by bolts 25. In some instances it may be possible to eliminate spring 26 altogether, though this is not recommended unless the flap is suitably restrained by some other means such as by the cam hereinafter described, because of the flutter problems which may thus be created.

Controlled movement of the flap in a clockwise direction as viewed in Figure 2 about the axis of bolt 25 and relative to frame 7 is obviously essential to maintain high flap efficiency for all positions from the stowed to the fully extended position. As stated earlier in the specification, it is desired to obtain maximum lift from the wing with minimum drag for take-off conditions. This is obtained by moving the flap rearwardly relative to the wing to increase the wing chord as much as possible while maintaining the flap at an attitude such that it will not noticeably change the general airfoil shape; that is, the mean camber in percent of chord in the flap area is made to vary substantially linearly with that of the wing immediately ahead of the flap. Also as stated earlier, the most effective use of the flap for landing conditions requires the development of high lift as well as high drag, the latter being beneficial because of the braking force thus produced. The necessary control over the angle of attack of the flap to insure its most efficient use in both situations is obtained by means of a cam mechanism 30 as best shown in Figures 3, 4 and 5. A lever member 31 swingably carried by frame 7 between plates 8 and 9 through pin 32, engages a flap control rod 33 through pin 34. The opposite end 35 of control rod 33 pivotally connects with a bracket 36 on flap 2 through pin 37. A roller 38 rotatably carried on an extension 39 formed on lever member 31 engages the lower or under side 40 of track 6 to control and limit the rotational movement of lever member 31. By controlling the shape of the under side 40 of track 6, which in effect serves as a cam, the angle of attack of the wing flap throughout the movement of carriage 1 may be closely controlled. Compression spring 26 together with the airflow around the wing maintains cam follower roller 38 in engagement with the cam which need not necessarily form a part of the track. At the trailing edge end 41 of track 6 the under side 40 thereof is built up forming detent 42 to provide a rapid increase in the curvature of the cam so that as the cam follower 38 rides up on detent 42, lever member 31 rotates the flap to the high angle of attack position in the extreme aft position of the carriage to provide high lift and high drag. By simply moving the carriage forwardly a short distance such that cam follower 38 will move off the steep slope of the cam as formed by detent 42, the angle of attack of the wing flap will decrease to provide a continuation of the main wing without materially modifying the camber thereof while maintaining substantially the same wing chord as is provided by fully extended and high drag position of the flap.

As will be apparent from Figure 4, rod 33 connecting lever member 31 with flap 2 acts in tension to resist both the spring load of compression spring 23 as well as the aerodynamic load on the flap which tends to prevent an increase in the angle of attack thereof. This design which places rod 33 in tension, together with the overall structural arrangement including the cam and cam follower allows an efficient design of the flap actuating mechanism to provide a compact carriage which will fit within the confines of a thin wing and which is structurally efficient.

To eliminate structural interference between frame 7 and flap 2, the leading edge of the flap is cut away or notched as indicated at 44 in Figure 3 as necessary to provide sufficient clearance for the angular movement of the flap relative to carriage frame 7. A second cutout or notch 45 in the flap, extending from leading edge cutout 44 to the trailing edge is required in the upper surface of the flap to accommodate track 6 while the flap is in the stowed or retracted position completing the normal contours of the wing to which it is attached. While these breaks in the flap contour have an undesirable aerodynamic effect in reducing flap efficiency they are relatively insignificant since the cutout areas represent only a very small percentage of the total flap area.

As indicated in Figure 1, two or more flap carriages are normally employed to support each wing flap. On most aircraft two carriages are sufficient while on aircraft with unusually long flaps more than two carriages might be required to absorb the loads and provide the necessary rigidity. In any event, the number of carriages employed is obviously dependent upon the design requirements of each specific application.

Actuation of flap 2 to move the same between the stowed and extended positions may be effected in any of a number of ways such as for example as shown in Figure 1 wherein power driven screw jacks 46 are secured to aircraft structure within the wing with the lead screw 47 forming a part thereof being suitably connected to the carriage and flap through pin 48 for example on frame 7. By simply actuating screw jacks 46 in unison to move carriage 1 along track 6 the flap may be moved between the retracted and extended positions as well as any intermediate position which includes the high lift-low drag position. While a screw jack arrangement is shown connecting with the carriage it should be understood that any type of actuating mechanism may be employed to move the flap and carriage relative to track 6 and that the actuating mechanism might be connected directly to the flap itself or to any part of the carriage frame.

To limit the maximum travel of the flap and carriage relative to track 6, suitable stops such as 48 and 49, which are secured to the track and adapted to engage rollers or other carriage structure, may be employed. The necessity of using mechanical stops of this nature depends largely upon the type of actuating mechanism employed.

Operation of the wing flap carriage is effected by actuation of the flap drive motors such as screw jacks 46. To obtain the proper flap position for take-off which is the high lift-low drag situation, screw jacks 46 drive carriage 1 aft to a position where cam follower 38 reaches but does not ride up on detent 42. In this position and at all intermediate positions from the stowed position, the flap provides an extension of the main wing without changing the general curvature or camber thereof to any substantial degree. Thus the wing and flap together serve as an efficient airfoil shape having a considerably greater chord length than the wing itself, resulting in a substantial increase in the wing lift coefficient with only a slight increase in drag.

By simply moving the flap and carriage rearwardly beyond the point at which cam follower 38 is at the threshold of detent 42, the increase in cam curvature effects rotation of bell crank member 31 to rotate flap 2 in a clockwise direction, as viewed in Figure 4, to materially increase the aerodynamic drag for braking purposes while at the same time maintaining as high or higher lift coefficient than is obtained in the high lift-low drag flap position.

Compression spring 26, in cooperation with the air loads on the flap, maintain cam follower 38 in engagement with the cam formed by the under side 40 of track 6. This insures the proper rotational position of the flap at all times and permits the design of a carriage configuration which will fit within a thin wing. While the cam is defined as being a part of track 6, it may obviously be separate from the rails themselves which support the carriage without departing from the teachings of the invention. Also, the cam may be of any desired curvature to produce the required flap attitude at all fore and aft positions thereof. The particular cam shape depends to a considerable extent on the curvature of the rails, which may be shaped as required to fit within the wing and the cam curved to compensate for any flap attitude errors thus introduced.

While a specific embodiment of the wing flap carriage has been shown, it is to be understood that certain alterations, modifications and substitutions may be made to the instant disclosure without departing from the teachings of this invention as defined by the spirit and scope of the appended claims.

We claim:

1. A device for supporting and guiding the movement of a flap on the wing of an aircraft comprising, a track carried by the wing, a frame carried on said track for fore and aft movement therealong between a stowed and an extended position, one end of said frame swingably connecting with said flap, a cam formed on said track, cam follower means carried by said frame and arranged to engage said cam and flap for limiting the rotational movement of said flap in only one direction at all fore and aft positions of the frame relative to the track, and spring means acting between said frame and said flap and urging the latter in a direction to normally maintain said cam follower means in engagement with said cam throughout the fore and aft movement of the frame whereby the desired rotational position of said flap is obtained.

2. A device for supporting and guiding the movement of a flap on the wing of an aircraft comprising, a track carried by the wing, a frame carried on said track for fore and aft movement therealong between a stowed and an extended position, one end of said frame swingably connecting with said flap, a cam formed on said track, cam follower means carried by said frame and arranged to engage said flap and cam for limiting the rotational movement of said flap in only one direction at all fore and aft positions of the frame relative to the track, and spring means carried by said frame and normally urging the cam follower into engagement with said cam whereby the desired rotational position of said flap is obtained at all fore and aft positions thereof.

3. In an aircraft having a wing and a flap adapted to be carried adjacent the trailing edge of the wing for both fore and aft and rotational movement relative thereto, a flap mounting device comprising, a track secured to the wing and aligned in a generally chordwise direction, a frame carried by said track for guided movement therealong between a stowed and an extended position, said frame swingably supporting said flap, a cam carried on said track, a lever member pivotally carried by said frame, a cam follower swingably carried by said lever member and arranged to engage said cam, a connecting rod acting between said flap and said lever member whereby rotation of the latter as effected by said cam and cam follower is transmitted to said flap for rotationally positioning the same throughout the fore and aft movement thereof, and spring means carried by said frame and urging said cam follower into positive engagement with said cam for damping vibrations in the flap and carriage.

4. In an aircraft having a wing and a flap adapted to be carried at the trailing edge of the wing, a flap mounting device comprising, a rail secured to the wing, a frame carried on said rail for fore and aft movement relative to the wing, said frame pivotally engaging said flap for rotatably supporting the same and effecting fore and aft movement thereof with said frame relative to said wing, a cam carried by said wing adjacent said rail, cam follower means carried by said frame and engaging said cam for controlling the rotational movement of said flap throughout the fore and aft movement of said frame, and spring means carried by said frame and urging said cam follower means into positive engagement with said cam.

5. A device for supporting and guiding the movement of a trailing edge flap on the wing of an aircraft comprising, a rail secured to the wing, a frame carried on said rail for fore and aft movement relative to the wing, said frame pivotally supporting said flap adjacent the leading edge thereof for effecting fore and aft movement of the flap with said frame relative to the wing, a cam carried by said wing adjacent said rail, a lever member swingably carried by said frame, a cam follower carried on said lever member for engaging said cam and controlling the rotational movement of said lever member throughout the fore and aft movement of said frame, a connecting rod action between said lever member and said flap whereby movement of the former is transmitted to the latter for controlling the flap attitude relative to the wing, and spring means acting between said flap and said frame normally urging said cam follower against said cam.

6. A device for supporting and guiding the movement of a flap on the wing of an aircraft comprising, a rail secured to the wing, a frame carried on said rail for fore and aft movement relative to the wing, said frame pivotally supporting said flap adjacent the leading edge thereof for effecting fore and aft movement of the flap with said frame relative to the wing, a cam carried by said wing adjacent said rail, a lever member swingably carried at one end thereof by said frame, a cam follower carried on said lever member at the opposite end thereof for engaging said cam and controlling the rotational movement of said lever member throughout the fore and aft movement of said frame, a flap attitude control rod connecting with said lever means intermediate of the ends thereof and with said flap for limiting the rotational movement of the latter in only one direction in accordance with the shape of said cam, and spring means acting between said flap and said frame urging said cam follower to engage said cam.

References Cited in the file of this patent

UNITED STATES PATENTS 2,348,150    Richter _____ May 2, 1944

FOREIGN PATENTS 732,918    Germany _____ Mar. 15, 1943